United States Patent [19]

Bommaraju et al.

[11] Patent Number: 5,154,860
[45] Date of Patent: Oct. 13, 1992

[54] CORROSION SUPPRESSION OF STAINLESS STEEL IN CAUSTIC MEDIA

[75] Inventors: Tilak V. Bommaraju, Grand Island; Robert G. Adams, Niagara Falls, both of N.Y.

[73] Assignee: Occidental Chemical Corporation, Niagara Falls, N.Y.

[21] Appl. No.: 760,307

[22] Filed: Sep. 16, 1991

[51] Int. Cl.$^5$ ............................................. C23F 11/18
[52] U.S. Cl. ...................................... 252/387; 422/13
[58] Field of Search ................ 252/389.4, 389.41, 390, 252/389.62, 387; 422/16, 13

[56] References Cited

U.S. PATENT DOCUMENTS 4,585,579  4/1986  Bommaraju .

OTHER PUBLICATIONS

Chemical Abstract CA(2):12811c, 1979, Perekhrest, N. A., et al., "Use of Hydrazine in Alkaline Etching of the Carbon Steel Surface".
Derwent Abstract 89-036793 "Manufacture of Chromated Galvanized Steel Material Excellent in Surface Characteristics", Kimura et al., 1987 of 87JP-192391.
Derwent Abstract 89-082676/11, "Manufacture of Chromated Zinc- or Zinc-Alloy-plated Steel Prods. by Electrolysing in Bath . . . ", Kawasaki Steel, 1987 of JP 01-36793.

Primary Examiner—Robert L. Stoll
Assistant Examiner—Valerie Fee
Attorney, Agent, or Firm—Richard D. Fuerle

[57] ABSTRACT

Disclosed is a method of inhibiting the electrochemical corrosion of stainless steel immersed in an aqueous solution of about 20 to about 40 wt % alkali metal hydroxide at a temperature of less than 100° C. About 2 to about 500 ppm of sodium borohydride, hydrazine, or a mixture thereof is added to the aqueous solution.

7 Claims, No Drawings

CORROSION SUPPRESSION OF STAINLESS STEEL IN CAUSTIC MEDIA

BACKGROUND OF INVENTION

This invention relates to inhibiting the corrosion of stainless steel that occurs in aqueous solutions of alkali metal hydroxides at temperatures of less than 100° C. In particular, it relates to the use of about 2 ppm to about 500 ppm wt % of sodium borohydride, hydrazine, or a mixture thereof, to inhibit corrosion of the stainless steel at that temperature.

Caustic soda (NaOH) is manufactured commercially by the electrolysis of brine. The materials of construction in that process for caustic storage and recirculation are often made of stainless steel. While stainless steel is a relatively inert material in that environment, it is nevertheless subject to gradual electrochemical corrosion. As the stainless steel corrodes, iron enters the solution, which not only lowers the product quality of the caustic being produced and but also reduces the efficiency of the catalytic cathodes by depositing iron on them and increasing the cell voltage. Iron, as $HFeO_2^{3-}$, also migrates through the cell membrane and deposits on the anode as an iron oxide, which increases the anode overvoltage, especially when the noble metal loading on the anode is low. In addition, the corroding materials must be periodically removed and cleaned with an acid wash.

U.S. Pat. No. 4,585,579 discloses the use of sodium borohydride to inhibit the corrosion of nickel in caustic solutions at temperatures of about 100° to about 200° C. However, until now, a good corrosion inhibitor for stainless steel in caustic solutions at temperatures below 100° C. has not been identified.

SUMMARY OF THE INVENTION

We have discovered that the corrosion of stainless steel in caustic solutions at temperatures of less than 100° C. can be inhibited by the addition, of sodium borohydride or hydrazine to the solution. We found the inhibitory effect of sodium borohydride to be surprising because sodium borohydride seems to have no effect on inhibiting the electrochemical corrosion of stainless steels that corrode intergranularly at higher temperatures, such as E-Brite.

DESCRIPTION OF THE INVENTION

The invention is applicable to caustic solutions of alkali metal hydroxides such as potassium hydroxide or sodium hydroxide. Sodium hydroxide is preferred because it is commercially more important. The caustic solutions that are corrosive to stainless steels and are the subject of this invention are those that contain about 20 to about 40 wt % caustic and are at a temperature of less than 100° C.

The invention is applicable to any type of stainless steel, i.e., steels containing over 50 wt % iron and about 10 to about 30 wt % chromium. Austenitic stainless steels contain both chromium and nickel with a minimum chromium content of 16 wt % and a minimum nickel content of 7 wt %. Ferritic stainless steels are characterized as not being hardenable through heat treatment, while martensitic stainless steels can be hardened by heat treatment. All three types of stainless steels are included within the scope of this invention, although austenitic stainless steels are preferred as they are more commonly used in the production of caustic soda. Particularly preferred is 316L stainless steel, an austenitic stainless steel having the composition 0.03 wt % carbon, 2.00 wt % manganese, 1.00 wt % silicon, 16.0 to 18.0 wt % chromium, 10.0 to 14.0 wt % nickel, 0.045 wt % phosphorus, 0.03 wt % sulfur, and 2.0 to 3.0 wt % molybdenum. The materials used during the electrolysis of brine are often made of stainless steel, although stainless steel can also be found in other parts in contact with the caustic soda solution.

Either sodium borohydride or hydrazine or a mixture thereof can be used to inhibit the corrosion of the stainless steel. Sodium borohydride is preferred because it has been found to be very effective. The amount of sodium borohydride or hydrazine used should be about 2 ppm to about 500 ppm (based on the weight of the solution) as less than about 2 ppm is not very effective and more than about 500 ppm is unnecessary and has little additional inhibitory effect. The preferred amount is about 2 to about 300 ppm as that is the most practical range.

The following examples further illustrate this invention.

EXAMPLE

Rotating cylindrical electrodes 1.6 cm in diameter, made out of 316L austenitic stainless steel were placed in beakers containing a 33% NaOH solution at 70° to 75° C., and were rotated at 1000 rpm for six hours. The solutions were analyzed for nickel and iron content before and after contact with the electrodes. The results are summarized in the table that follows:

| Element | Corrosion Rate ($gm/m^2 \cdot hr$) | | | |
|---|---|---|---|---|
| | 33% NaOH (Stock Solution) | 316L in 33% NaOH | 316L with 100 ppm $NaBH_4$ | 316L with 300 ppm $NaBH_4$ |
| Fe | 0.38 | 1.06 | 0.60 | 0.50 |
| Ni | <0.12 | <0.12 | <0.12 | <0.12 |

The above table shows that the corrosion of nickel was not a problem under the conditions of the experiment, and that treatment with the sodium borohydride did not affect the corrosion rate of the nickel. However, the sodium borohydride significantly reduced the corrosion of the iron. Based on the above data, the corrosion rate was estimated and is given in the table that follows:

| | Corrosion Rate ($gm/m^2 \cdot hr$) |
|---|---|
| 33% NaOH | 0.110 |
| 33% NaOH + 100 ppm $NaBH_4$ | 0.037 |
| 33% NaOH + 300 ppm $NaBH_4$ | 0.020 |

These results clearly show that corrosion of the stainless steel was suppressed by the addition of sodium borohydride.

The experiment was repeated using no sodium borohydride with a rotating cylinder electrode made from 316L stainless steel that had been previously treated with 300 ppm of sodium borohydride. The corrosion rate dropped from 0.11 $gm/m^2.hr$ in the previous test to 0.06 $gm/m^2.hr$, indicating that a protective film had formed over the electrode during the addition of sodium borohydride. This suggests that it is not necessary to continuously add sodium borohydride to achieve corrosion suppression of stainless steel in caustic media once the surface film has been formed.

We claim:

1. A method of inhibiting the corrosion of austenitic stainless steel that consists essentially of iron and chromium, which is immersed in an aqueous solution of about 20 to about 40 wt % alkali metal hydroxide at a temperature of less than 100° C., comprising adding to said aqueous solution about 2 to about 500 ppm of a compound selected from the group consisting of sodium borohydride or sodium borohydride in combination with hydrazine.

2. A method according to claim 1 wherein said compound is sodium borohydride.

3. A method according to claim 1 wherein said alkali metal hydroxide is sodium hydroxide.

4. A method according to claim 1 wherein said stainless steel is 316L.

5. A method according to claim 1 wherein about 2 to about 300 ppm of said compound is added.

6. A method of processing an aqueous stream of about 20 to about 40 wt % sodium hydroxide at a temperature less than 100° C. in contact with austenitic stainless steel that consists essentially of iron and chromium without substantial corrosion of the iron in said stainless steel comprising adding about 2 to about 300 ppm sodium borohydride to said aqueous stream.

7. A method according to claim 6 wherein said stainless steel is 316L.

* * * * *